United States Patent [19]
Garnett et al.

[11] Patent Number: 5,664,470
[45] Date of Patent: Sep. 9, 1997

[54] TOOL TURRET INDEXER

[75] Inventors: Donald W. Garnett, Grand Ledge; John A. Watson, East Lansing, both of Mich.

[73] Assignee: The Olofsson Corporation, Lansing, Mich.

[21] Appl. No.: 642,919

[22] Filed: May 6, 1996

[51] Int. Cl.⁶ .................................................. B23B 3/16
[52] U.S. Cl. ................................................. 82/121; 408/56
[58] Field of Search .............................. 82/121, 159, 158; 408/57, 56; 409/201

[56] References Cited

U.S. PATENT DOCUMENTS

| | | | |
|---|---|---|---|
| 3,595,109 | 7/1971 | Burroughs | 82/34 |
| 4,587,871 | 5/1986 | Lahm | 82/2 R |

FOREIGN PATENT DOCUMENTS

| | | | |
|---|---|---|---|
| 4316094 | 10/1994 | Germany | 82/121 |
| 316101 | 12/1989 | Japan | 82/121 |
| 98701 | 4/1991 | Japan | 82/121 |
| 2233266 | 1/1991 | United Kingdom | 82/121 |

*Primary Examiner*—Daniel W. Howell
*Assistant Examiner*—Mark Williams
*Attorney, Agent, or Firm*—Barnes, Kisselle, Raisch, Choate, Whittemore & Hulbert, P.C.

[57] ABSTRACT

A tool turret has a brake to retain the turret in an an index position. The brake has stationary and rotatable brake members, each formed with a cone-shaped braking surface and a radial or face braking surface. A tooling plate carries a plurality of cutting tools and is mounted on the rotatable brake member. When the brake members are moved toward one another, the cone-shaped braking surfaces engage and the face braking surfaces engage in an indexed position in which one of the cutting tools is brought into a position for engaging a workpiece. When the brake members are disengaged, a motor turns the rotatable brake member and the tooling plate to another indexed position. The cone-shaped braking surfaces are mounted on flexibly resilient braking elements of the brake members to enable them to flex upon initial engagement of the cone-shaped braking surfaces, so that further movement of the brake members towards one another into full engagement with the face braking surfaces is permitted. The brake member on which the tooling plate is mounted is attached to the motor rotor by a flexible section, and the stator of the motor is mounted on a flex plate to enable axial float of the motor and to compensate for any lateral or angular misalignment of the motor and brake, so that full braking engagement can be achieved.

17 Claims, 3 Drawing Sheets

TOOL TURRET INDEXER

FIELD OF THE INVENTION

This application relates generally to tool turret indexers and more particularly to a tool turret indexer having substantially simultaneous cone and face brake contact for precise positioning and holding of the index position.

BACKGROUND OF THE INVENTION

In machine tools, it is common practice to mount several tools on a tool turret, such that the tools may be brought in succession to bear against the workpiece. To accurately machine the workpiece, the tools must be precisely positioned and rigidly supported against the disturbing forces of the tool cutting loads. To increase the productivity of the machine, the time required to index should be as short as possible. To limit the cost of the machine tool, the tool indexer should be inexpensive to manufacture and operate reliably in a contaminated tool cutting environment. The tool turret should also be resistant to damage by accidental impact of the tools with the workpiece or the machine structure. The tool turret should also be capable of directing cutting fluid to whichever tool is brought to bear against the workpiece.

SUMMARY OF THE INVENTION

In accordance with the present invention, the tool turret includes a brake to retain the turret in an index position. The brake has a stationary brake member and a rotatable brake member, each formed with an annular cone-shaped braking surface and an annular radial or face braking surface. A tooling plate carrying a plurality of cutting tools is mounted on the rotatable brake member. When the brake members are moved axially toward one another, the cone-shaped braking surfaces engage and the radial braking surfaces engage in an indexed position in which one of the cutting tools is brought into a position for engaging a workpiece. When the brake members are disengaged, a motor turns the rotatable brake member and the tooling plate to another index position.

Preferably, when the brake is set, the cone-shaped braking surfaces are the first to engage, thus providing a concentric relationship between the two engaged cones. Also, this assures that a large portion of the engaging force is applied to the cone brake. Cone brakes have a mechanical advantage in their brake holding power versus engaging force as compared to face brakes. The cone-shaped surface of one or both of the brake members is preferably formed of a flexibly resilient braking element to enable it to flex and permit further relative axial movement of the brake members toward one another until the radial braking surfaces engage, thus providing a parallel positioning of the two brake members. In this way, a full engagement of both the cone-shaped and radial braking surfaces is assured.

The brake member on which the tooling plate is mounted is preferably attached to the rotor of the motor by a flexible section enabling full engagement of the braking surfaces despite lateral or angular misalignment of the motor and the brake. It is also preferred to mount the stator of the motor on the machine frame by a flex plate to enable the motor to float axially and allow the rotatable brake member to move into engagement with the stationary brake member.

In the specific embodiment about to be described, a space is provided between the brake members which is closed when the braking surfaces are engaged to contain a charge of air under pressure. When the brake disengages and opens the space, the air under pressure escapes and prevents the entry of foreign matter.

The tool turret of the present invention also preferably has a tube extending through the stator of the motor defining a fluid passage for cutting fluid which may be directed to any of the cutting tools on the tooling plate by radial passages which are brought into communication with the fluid passage at each indexed position of the tooling plate.

One object of this invention is to provide a tool turret indexer having the foregoing features and capabilities.

Another object is to provide a tool turret indexer which is composed of a relatively few simple parts, is rugged and durable in use, is capable of being inexpensively manufactured, will operate reliably in the contaminated cutting tool environment, and in which the indexer is driven by a high torque, low R.P.M. motor to a precise angular position.

These and other objects, features and advantages of the invention will become more apparent as the following description proceeds, especially when considered with the accompanying drawings.

DETAILED DESCRIPTION OF THE PREFERRED EMBODIMENT

Figure 1:
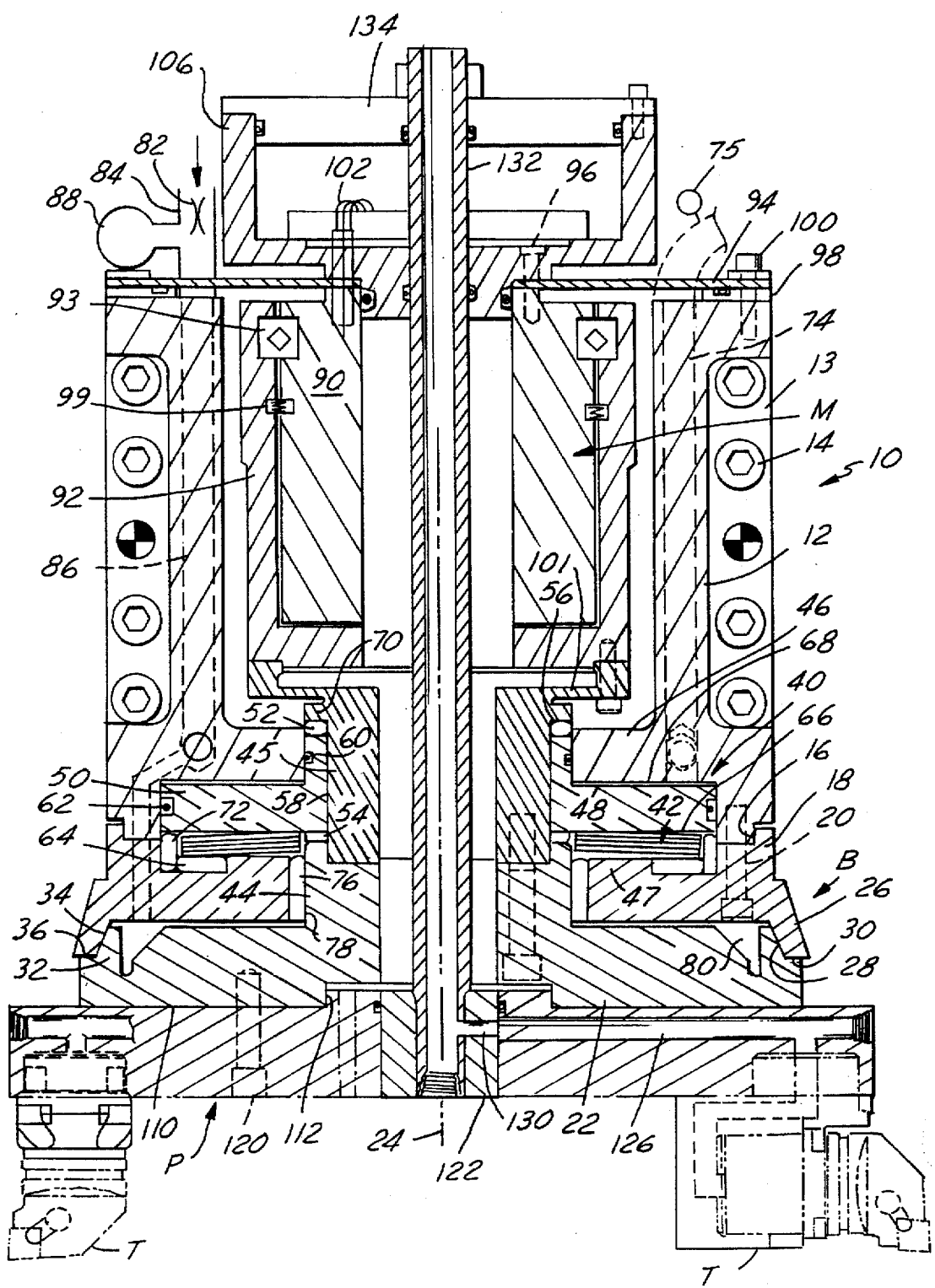
FIG. 1 is a vertical sectional view of a tool turret indexer constructed in, accordance with the invention, showing the brake engaged.

Referring now more particularly to the drawings, the tool turret, generally designated 10, has a servomotor M within a housing or frame 12, a brake B, and a tooling plate P on which are mounted a plurality of cutting tools T.

The housing 12 is mounted to the machine structure 13 as by means of bolts 14. The lower extremity of the housing 12 has a pilot portion 16 which engages and locates the stationary brake member 18 of the brake B. Bolts 20 complete the attachment of the stationary brake member 18 to the housing 12.

The brake B also includes a rotatable and axially shiftable brake member 22 which confronts the brake member 18. The brake member 22 is concentric with the brake member 18 and is rotatable about the central axis 24 of the motor M as will be more fully described hereinafter.

The stationary brake member 18 has a downwardly and radially outwardly extending flange or braking element 26 which has an annular radially inner cone-shaped braking surface 28 and, at the lower extremity of the cone-shaped braking surface 28, has an annular radially outwardly extending face braking surface 30. The cone-shaped braking surface 28 is slanted downwardly and radially outwardly and connects into the inner extremity of the radial braking surface 30.

The brake member 22 has an upwardly extending annular flange or braking element 32 which has an annular radially outer cone-shaped braking surface 34 which is slanted upwardly and radially inwardly. An annular radial face braking surface 36 extends radially outwardly from the lower extremity of the braking surface 34. The braking elements 26 and 32 of the brake members 18 and 22, and the cone-shaped and radial face braking surfaces of the brake members are concentric with the central axis 24 of the motor.

The cone-shaped braking surfaces 28 and 34 of the two brake members 18 and 22 confront one another and are inclined at the same angle and are designed to have full surface-to-surface braking contact when the brake members are engaged as shown in FIG. 1. The radial braking surfaces 30 and 36 of the brake members confront one another and are also intended to have a full surface-to-surface braking contact when the brake members are engaged as shown in FIG. 1.

Figure 2:
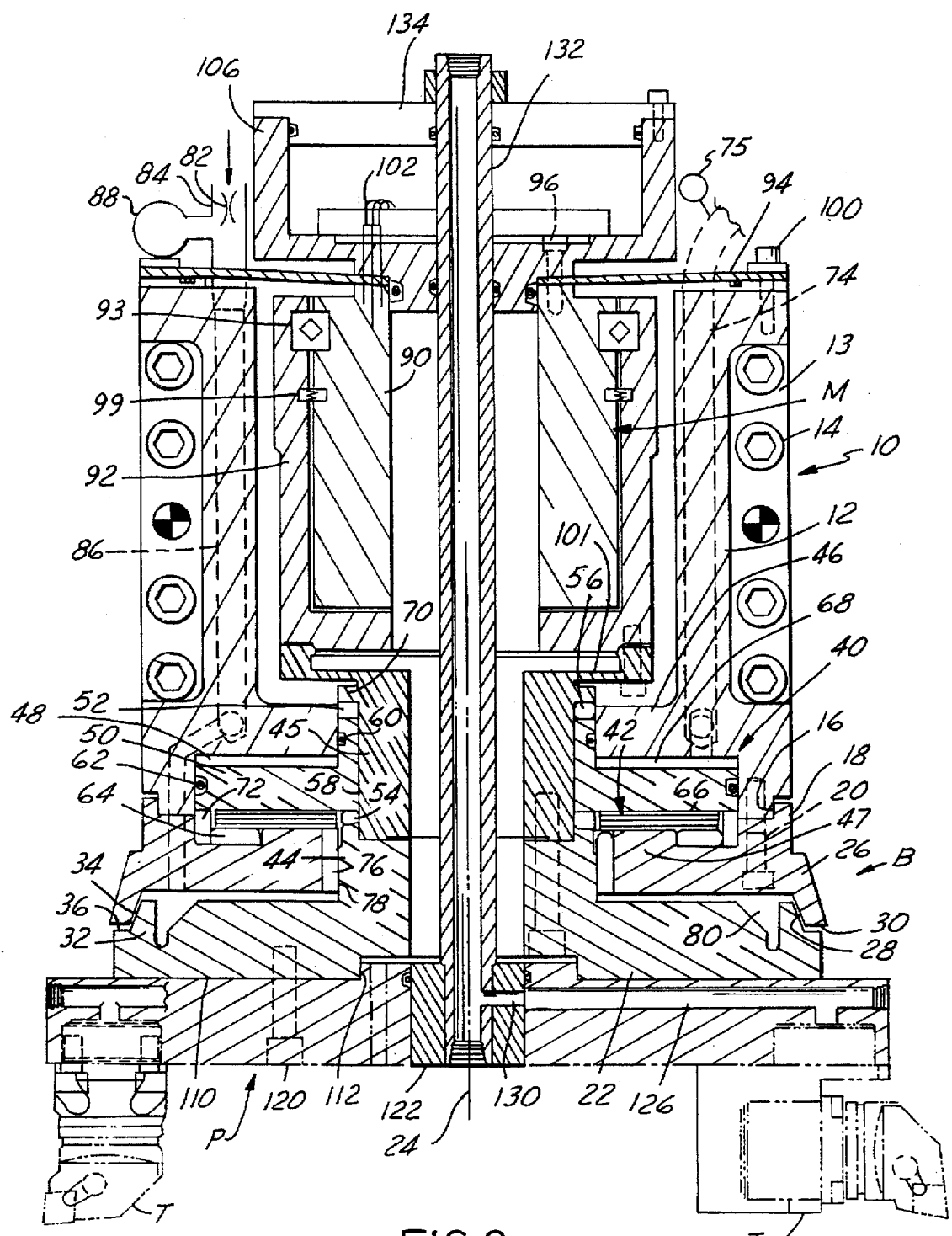
FIG. 2 is a vertical sectional view similar to FIG. 1, showing the brake disengaged.
Figure 3:
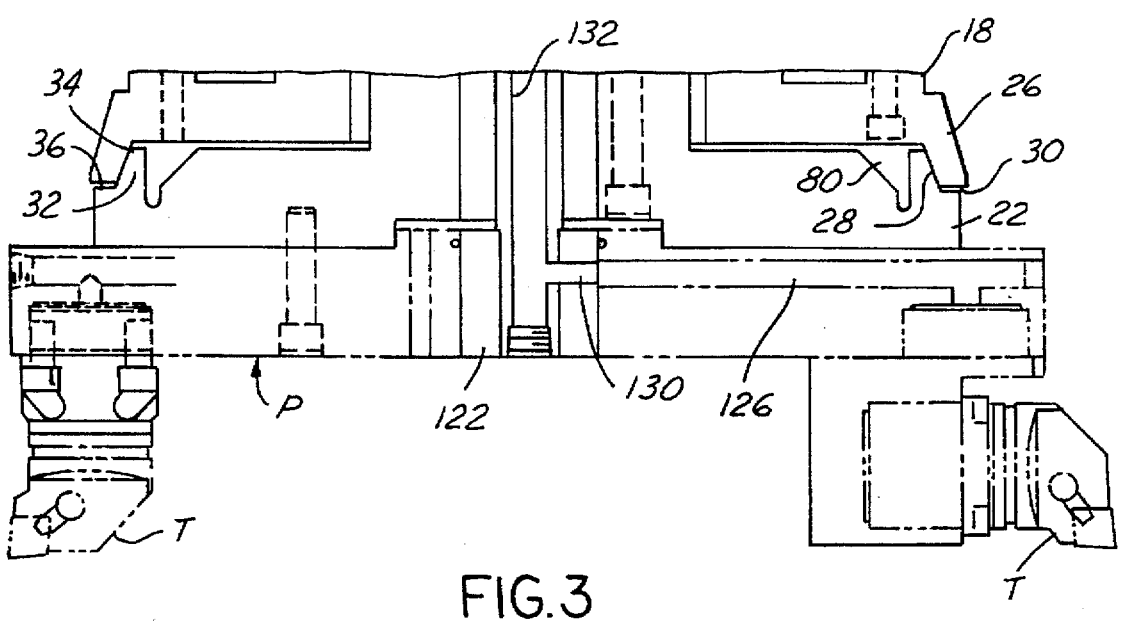
FIG. 3 is a fragmentary sectional view showing the brake of FIGS. 1 and 2 in an intermediate position in which initially only the cone-shaped braking surfaces are in contact.

The braking element 26 of the brake member 18 and the braking element 32 of the brake member 22 are both of thin cross-section and flexibly resilient and therefore compliant upon engagement. FIG. 2 shows the brake members 18 and 22 disengaged. FIG. 1 shows the brake members fully engaged with the cone-shaped braking surfaces 28 and 34 in full surface-to-surface contact and the radial face braking surfaces 30 and 36 in full surface-to-surface contact. FIG. 3 shows the brake in an intermediate position in which the cone-shaped braking surfaces have made initial contact before there is any contact between the radial braking surfaces. The flexibility and compliance of the braking elements 26 and 32 enables the braking element 26 of the stationary brake member 18 to flex radially outwardly and the braking element 32 of the brake member 22 to flex radially inwardly sufficiently to enable the brake members to continue to close beyond the intermediate FIG. 3 position to the FIG. 1 position in which both the cone-shaped braking surfaces and the radial braking surfaces are in full contact with one another.

The brake member 22 is moved vertically and axially along the central axis 24 into and out of braking engagement with the stationary brake member 18 by means of a piston cylinder assembly 40 and a heavy Bellville spring 42. More specifically, the movable brake member 22 has a central annular extension 44 which is bolted to a shaft extension 45 that cooperates with portions 46 of the housing 12 and 47 of stationary brake member 18 in defining an annular cylinder 48 in which an annular hydraulic piston 50 is vertically reciprocable. The piston is entrapped between thrust washers 52 and 54 with a small clearance at 56. Piston 50 does not rotate and has running clearance at 58 and O-ring seals 60 and 62.

The stationary brake member 18 has a hardened thrust washer 64 recessed into its upper face. The Bellville spring 42 is compressed between the thrust washer 64 and the hardened bottom surface 66 of the hydraulic piston 50. When there is no hydraulic fluid pressure in the cylinder 48 at 68, the Bellville spring provides the force for axially raising or retracting the brake member 22 into engagement with the brake member 18 as shown in FIG. 1, by exerting its force against the piston 50 and thence against thrust washer 52 and thrust shoulder 70 of the shaft extension 45 which is bolted to the brake member 22.

When hydraulic fluid pressure is applied at 68 in the hydraulic cylinder 48, the piston 50 overcomes the force of the spring 42 to drive the brake member 22 axially downward to disengage the brake members 18 and 22, as in FIG. 2, and allow the brake member 22 to rotate. The piston 50 is limited in its downward movement by a stop ring 72. Hydraulic pressure is admitted into the cylinder through a vertical passage 74 in housing 12. The hydraulic fluid pressure is valved on by valve 75 to disengage the brake before the brake member 22 is rotated to a different position. The hydraulic pressure is valved off to allow the spring 42 to re-engage the brake.

In the disengaged position of the brake, the brake member 22 is supported for rotation by a bushing 76. Bushing 76 is supported in an internal bore in the stationary brake member 18. The bearing clearance at 78 is large enough that it will not oppose centering of the brake member 22 when engaged, but small enough that it prevents contact of the cone-shaped portions of the brake members when disengaged.

An annular cavity 80, formed between the brake members 18 and 22, is constantly supplied with air under pressure through an orifice 82 of a T-fitting 84 and thence through a vertical passage 86 in housing 12 and a continuing passage in the brake member 18. When the brake is disengaged, air escapes rapidly from the cavity 80 through the opening between the cone-shaped and radial braking surfaces to prevent the entry of contamination between the engaging surfaces of the brake members. The rapid loss of air pressure, downstream from the restricting orifice 82, allows the air pressure to drop. Air pressure switch 88 opens in response to this drop in air pressure and opens and signals that the brake is disengaged to initiate index rotation of the brake member 22 to a new position by the servomotor M which will now be described.

The motor M has a stator 90 and a rotor 92 mounted on the stator by bearing 93 for rotation about the central axis 24. The motor M may be a commercially available high torque, low R.P.M. motor. The stator 90 is mounted on a flexure plate 94 by bolts 96. The flexure plate in turn is mounted on the upper face of the housing 12 on a spacer 98 by bolts 100. The shaft extension 45 has a flexure section 101. The flexure plate 94 and the flexure section 101 are made of strong flexibly resilient material. The combination of the flexure plate 94 and the flexure section 101 allows the motor M to float axially for engagement and disengagement of the brake member 22 with the stationary brake member 18 and allows the cone and radial braking engagement to occur without any material resistance due to lateral or angular misalignment of the motor and brake. It is primarily flexure plate 94 which allows the axial float of the motor M and the flexure section 101 which enables full braking engagement despite possible lateral or angular misalignment of the motor and brake.

The flexure plate 94 is in a relaxed or neutral position as shown in FIG. 1 when the brake members are fully engaged. In the disengaged position, the motor can float axially downwardly as permitted by the downward flex of the flexure plate 94 (see FIG. 2) which then partially supports the weight of the brake member 22 to relieve the axial pressure of weight on the thrust washer 52, thereby partially carrying the weight on the bearing 93.

Motor M is controlled by an encoder 99 which enables the motor to index and precisely position the rotor and hence the brake member 22 to various commanded positions given to the motor drive. The encoder responds to operation of the air switch 88 when it signals that the brake is disengaged.

Electrical power to the motor M and to the encoder 99 is supplied through cable 102 which extends through the upper end of stator 90 and terminates in a liquid tight terminal box 106. Connections from the terminal box to the drive for the motor are carried in liquid tight connectors. The terminal box 106 is secured to the stator 90 and the flexure plate 94 by the bolts 96.

The brake member 22 has a bottom face 110 formed with a pilot recess 112 to mount the tooling plate P. Tools T are mounted on the tooling plate in circumferentially spaced relation about the central axis 24 at each of the motor index positions. Bolts 120 secure the tooling plate to the brake member 22. Obviously, other tooling plates may be substituted for the one shown by a similar attachment to the bottom face of the brake member 22.

The tooling plate P has a central bore which receives a non-rotating bushing 122. A plurality of radially extending horizontal passages 126 are drilled in the tooling plate at each index position to extend to a tool T at each of the index positions. Only one of the drilled passages communicates at one time with a single drilled port 130 in the bushing 122 depending on the index position of the tooling plate. The bushing 122 is secured to a stationary cutting fluid carrying tube 132 which extends vertically upward through the brake members 18 and 22 and through the shaft extension 45 and the motor stator 90 and terminal box 106. The upper end of the tube 132 is fixedly attached to the cover 134 of the terminal box to prevent the tube from rotating. Pressurized cutting fluid is continuously fed into the upper end of the tube and directed to the appropriate drilled passage in the tooling plate to deliver fluid to the particular tool which has been brought to the index position to bear on the workpiece.

In operation, the valve 75 is normally positioned to relieve hydraulic fluid pressure in the cylinder 48 so that the brake members 18 and 22 are engaged by the Bellville spring 42 to retain the tooling plate P in a particular index position. When it is desired to rotate the tooling plate to another index position, the valve 75 is positioned to admit hydraulic fluid under pressure to the cylinder, driving the piston 50 downward against the force of spring 42 to disengage the brake. When the brake is disengaged, air in the cavity 80 escapes through the opening between the braking surfaces of the brake members 18 and 22, causing a drop in air pressure which operates air pressure switch 88 to signal that the brake is disengaged and initiating operation of the motor M to rotate the brake member 22 and the tooling plate P attached thereto to another index position. At the new index position, the valve 75 relieves the hydraulic fluid pressure in the cylinder 48, permitting the spring 42 to set the brake.

What is claimed is:

1. A tool turret comprising
a machine frame,
a motor mounted on said machine frame,
said motor having a rotor rotatable about a central axis,
a brake,
said brake having a first brake member connected to said rotor for rotation therewith about said central axis,
said brake having a non-rotatable second brake member mounted on said machine frame in confronting relation to said first brake member,
said first brake member having an annular cone-shaped braking surface and an annular radial braking surface, both said braking surfaces being concentric with the axis of rotation of said rotor and said first brake member,
said second brake member having an annular cone-shaped braking surface and an annular radial braking surface confronting and concentric with the respective cone-shaped and radial braking surfaces of said first brake member,
means for relatively moving said brake members axially toward and away from one another to engage and disengage the confronting cone-shaped and radial braking surfaces of said brake members,
a tooling plate mounted on said first brake member, said tooling plate carrying a plurality of cutting tools in angularly spaced relation about said central axis, and
means for operating said motor when said brake members are disengaged to turn said rotor and hence said tooling plate to various angular positions depending on the spacing of said cutting tools.

2. A tool turret as defined in claim 1, wherein said cone-shaped braking surfaces engage upon initial relative movement of said brake members toward one another prior to engagement of said radial braking surfaces, and said cone-shaped surface of one of said brake members is formed on a flexibly resilient braking element of said one brake member to enable said braking element to flex and permit further relative movement of said brake members toward one another until said radial braking surfaces engage.

3. A tool turret as defined in claim 1, wherein said cone-shaped braking surfaces engage upon initial relative movement of said brake members toward one another prior to engagement of said radial braking surfaces, and said cone-shaped surfaces of said brake members are formed on flexibly resilient braking elements of said brake members to enable said braking elements to flex and permit further relative movement of said brake members toward one another until said radial braking surfaces engage.

4. A tool turret as defined in claim 1, wherein said motor is mounted on said machine frame by a flexible mounting to enable said motor to float and thus allow full engagement of said cone-shaped and radial braking surfaces.

5. A tool turret as defined in claim 1, wherein said motor is mounted on said machine frame by means including a flex plate enabling said motor to float axially and allow axial engagement of said cone-shaped and radial braking surfaces.

6. A tool turret as defined in claim 1, wherein the connection between said rotor and said first brake member includes a flexible section enabling full engagement of said cone-shaped and radial braking surfaces despite lateral or angular misalignment of said motor and brake.

7. A tool turret as defined in claim 1, wherein said means for relatively moving said brake members comprises a hydraulic piston-cylinder assembly.

8. A tool turret as defined in claim 7, wherein said piston-cylinder assembly includes a piston reciprocable within a cylinder, spring means normally advancing said piston to engage said brake members, and means for admitting hydraulic fluid under pressure into said cylinder to retract said piston against the force of said spring means and disengage said brake members.

9. A tool turret as defined in claim 1, and further including means providing a space between said brake members which is closed when said cone-shaped and radial braking surfaces of said brake members are engaged, and means for charging said space with air under pressure so that when said cone-shaped and radial surfaces of said brake members disengage and open said space, the air under pressure escapes past said cone-shaped and radial braking surfaces and thereby prevents the entry of foreign matter.

10. A tool turret as defined in claim 9, including means for activating the motor in response to the reduction in air pressure in said space when said brake members disengage.

11. A tool turret as defined in claim 1, and further including a tube through said motor having a bushing rotatably receiving said tooling plate, said tooling plate having radial passages leading to said respective cutting tools, said tube defining a fluid passage for cutting fluid leading to said bushing, said bushing having a port connecting said fluid passage with one of said radial passages depending on the rotative position of said tooling plate.

12. A tool turret comprising a machine frame, a motor mounted on said machine frame, said motor having a stator and a rotor rotatable on said stator about a central axis, a brake, said brake having a first brake member connected to said rotor for rotation therewith about said central axis, said brake having a non-rotatable second brake member mounted on said machine frame in confronting relation to said first brake member, said first brake member having an annular cone-shaped braking surface and an annular radial braking surface, both said braking surfaces being concentric with the axis of rotation of said rotor and said first brake member, said second brake member having an annular cone-shaped braking surface and an annular radial braking surface confronting and concentric with the respective cone-shaped and radial braking surfaces of said first brake member, means for moving said first brake member axially toward and away from said second brake member to engage and disengage the confronting cone-shaped and radial braking surfaces of said brake members, said cone-shaped braking surfaces being adapted to engage upon initial movement of said first brake member toward said second brake member prior to engagement of said radial braking surfaces, said cone-shaped surfaces of said brake members being formed on flexibly resilient braking elements of said members to enable said braking elements to flex and permit further movement of said first brake member toward said second brake member until said radial braking surfaces engage, a tooling plate mounted on said first brake member, said tooling plate carrying a plurality of cutting tools in angularly spaced relation about said central axis, and means for operating said motor when said brake members are disengaged to turn said rotor and hence said tooling plate to various angular positions depending on the spacing of said cutting tools.

13. A tool turret as defined in claim 12, wherein the stator of said motor is mounted on said machine frame by a flex plate enabling said motor to float axially and allow axial engagement of said cone-shaped and radial braking surfaces, and the connection between said rotor and said first brake member includes a flexible section enabling full engagement of said cone-shaped and radial braking surfaces despite lateral or angular misalignment of said motor and brake.

14. A tool turret as defined in claim 13, wherein said means for moving said first brake member comprises a hydraulic piston cylinder assembly, said piston cylinder assembly including a piston reciprocable within a cylinder, a Belleville spring urging said piston in a direction to advance said first brake member toward and into engagement with said second brake member, and means for admitting hydraulic fluid under pressure into said cylinder to retract said piston against the force of said spring and move said first brake member away from engagement with said second brake member.

15. A tool turret as defined in claim 14, and further including means providing a space between said brake members which is closed when said cone-shaped and radial braking surfaces of said brake members are engaged, and means for charging said space with air under pressure so that when said cone-shaped and radial surfaces of said brake members disengage and open said space, the air under pressure escapes past said cone-shaped and radial braking surfaces and thereby prevents the entry of foreign matter.

16. A tool turret as defined in claim 15, including means for activating the motor in response to the reduction in air pressure in said space when said brake members disengage.

17. A tool turret as defined in claim 16, and further including a tube extending through said stator having a bushing rotatably receiving said tooling plate, said tooling plate having radial passages leading to said respective cutting tools, said tube defining a fluid passage for cutting fluid leading to said bushing, and said bushing having a port connecting said fluid passage with one of said radial passages depending on the rotative position of said tooling plate.

* * * * *